United States Patent Office 2,895,605
Patented July 21, 1959

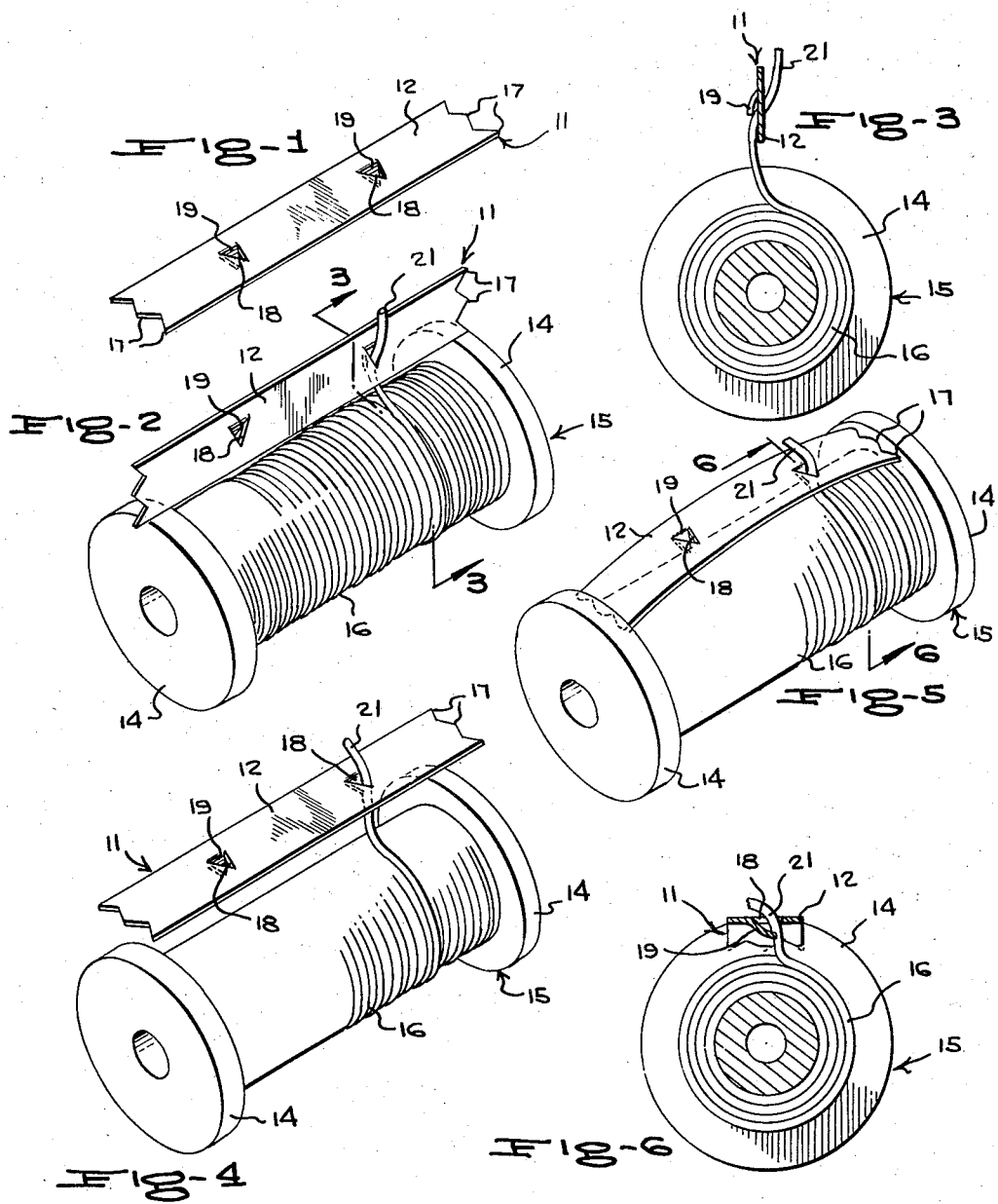

2,895,605

SELF-LOCKING CABLE RETAINER

Marjorie D. Nash, Fort Wayne, Ind.

Application February 1, 1957, Serial No. 637,738

4 Claims. (Cl. 206—55)

This invention relates to locking devices for spools of flexible material, such as for cable elements, wire, or the like, and more particularly to a locking device adapted to be engaged between the end flanges of a spool to secure a flexible element on the spool.

A main object of the invention is to provide a novel and improved locking means for fastening a flexible element on a spool, said locking means being simple in construction, being easy to install, and securely holding the flexible element in a taut condition on the spool.

A further object of the invention is to provide an improved cable-retaining member for use on a spool having enlarged end flanges, the cable retaining member being inexpensive to manufacture, being durable in construction, and serving to lockingly secure the ends of a cable element or wire in a taut condition on the spool and to prevent the accidental unwinding thereof.

Further objects and advantages of the invention will become apparent from the following description and claims, and from the accompanying drawings, wherein:

Figure 1 is a perspective view of an improved cable-retaining member constructed in accordance with the present invention.

Figure 2 is a perspective view showing the manner in which the end of a cable element is engaged through the retaining member preliminary to securing the retaining member on a spool to hold the cable member against unwinding therefrom.

Figure 3 is an enlarged transverse vertical cross sectional view taken on the line 3—3 of Figure 2.

Figure 4 is a perspective view, similar to Figure 2, but showing the cable-retaining member rotated to a horizontal position, preparatory to engaging the same between the enlarged end flanges of the spol.

Figure 5 is a perspective view, similar to Figures 2 and 4, showing the retaining member in its final engaged position between the end flanges of the spool.

Figure 6 is an enlarged transverse vertical cross sectional view taken on the line 6—6 of Figure 5.

Referring to the drawings, the improved cable-retaining member of the present invention is designated generally at 11 and comprises a flat flexible bar element 12 of any suitable resilient material, such as resilient metal, the bar element being generally rectangular in shape and being relatively elongated, as shown in Figure 1. The flat flexible bar element 12 is of a length slightly greater than the spacing between the enlarged end flanges 14, 14 of a conventional spool 15, such as a spool adapted to receive a cable member 16 spirally wound thereon, as shown in Figures 2, 4 and 5. The ends of the flexible bar member 12 are formed with the triangular serrations 17, adapted to grippingly engage in the inside surfaces of the end flanges 14 of the spool to lock the bar member fixedly to the spool, as will be presently described.

The bar member 12 is downwardly struck at a plurality of locations therealong, for example, at the two locations shown in Figure 1 to define apertures 18, and to define downwardly struck triangular spurs 19. The apertures 18 may be located in any desired positions along the bar member, and in the specific embodiment illustrated herein are located at equal distances from the ends of the bar member and are spaced apart by a substantial distance, of the order of one-half the length of the bar member.

In using the retainer 11, said retainer is first arranged parallel to the spool 15 and with the bar member 12 extending substantially in a radial plane relative to the spool, as shown in Figure 2. The end 21 of the cable element 16 is then engaged through one of the apertures 18 in the manner illustrated in Figure 2. The retainer 11 is then rotated to the horizontal position thereof shown in Figure 4 and is then flexed to bow its intermediate portion upwardly until the ends of the bar member 12 can be engaged between the end flanges 14, 14 of the spool. Said ends are then engaged with the end flanges 14, 14 in the manner illustrated in Figure 5, the bar member being released so that the tension therein tends to straighten out the bar member and to cause the serrations 17 to penetrate further into the end flanges 14, 14 of the spool. The tension of the bar member 12 serves to anchor the serrations 17 in the end flanges 14 and to secure the retainer 11 rigidly to the spool so that the cable element 16 may be held in a taut condition.

In order to release the end 21 of the cable element, it is merely necessary to pull the intermediate portion of the retainer 11 upwardly, whereby the serrations 17 are disengaged from the spool end flanges 14, 14, and whereby the cable end 21 may be withdrawn from the aperture 18 in which it is engaged.

As shown in Figure 6, the spurs 19 are preferably curved downwardly and rearwardly, namely, toward the right, as viewed in Figure 6, so that the pointed end of the spur may be engaged in the cable end portion 21 to lock the cable end against movement when the retainer is engaged between the spool end flanges 14 in the manner illustrated. Thus, the spurs 19, 19 serve as a means for preventing accidental unfastening of the cable end from the retainer and as a means to thereby prevent undesired unwinding of the cable from the spool.

While Figures 5 and 6 show the retainer as bowed upwardly when installed between the reel end flanges 14, 14, the retainer can also be employed in a downwardly bowed configuration since the retainer may be flexed in either direction.

While the drawings disclose single depending lugs at the apertures 18, said apertures may be formed to define double or multiple depending downwardly struck triangular lugs which may engage the cable elements therebetween and hold said cable elements on the reel. Thus, the retainer may be pressed between the flanges of the reel and the end of the cable element may be engaged between a pair of such depending triangular lugs and be thus anchored to the reel.

While a specific embodiment of an improved means for retaining a cable element on a spool has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a reel having a pair of end flanges, a cable element wound on said reel, and a relatively flat flexible retaining bar having serrated ends engaged with said end flanges and having a locking aperture receiving said cable element, said aperture being formed with a downwardly struck pointed spur lockingly engaged with said cable element.

2. A device of the character described comprising a cylindrical spool having opposite end flanges, a relatively flat flexible retaining bar having opposite serrated ends engaged with said end flanges and having a locking aperture adapted to receive a cable element, said aperture being formed with a downwardly struck pointed spur adapted to be lockingly engaged with the cable element.

3. A device of the character described comprising a cylindrical spool having opposite end flanges, a relatively flat flexible retaining bar having opposite ends engaged with said end flanges and having a locking aperture adapted to receive a cable element, said aperture being formed with a downwardly struck pointed spur adapted to be lockingly engaged with the cable element.

4. In a reel having a pair of end flanges, a cable element wound on said reel, and a relatively flat flexible retaining bar having opposite ends engaged with said end flanges and having a locking aperture receiving said cable element, said aperture being formed with a downwardly struck pointed spur lockingly engaged with said cable element.

References Cited in the file of this patent

UNITED STATES PATENTS

| 222,115 | Wolcott | Nov. 25, 1879 |
| 1,698,574 | Winchell | Jan. 8, 1929 |

FOREIGN PATENTS

| 19,887 | Great Britain | 1914 |
| 433,714 | Great Britain | Aug. 16, 1935 |